(12) United States Patent
McManamon (10) Patent No.: US 11,740,357 B2
(45) Date of Patent: *Aug. 29, 2023

(54) SYSTEM, METHOD, AND APPARATUS FOR DETECTING AND CHARACTERIZING GROUND MOTION

(71) Applicant: Exciting Technology, LLC, Dayton, OH (US)

(72) Inventor: Paul F. McManamon, Dayton, OH (US)

(73) Assignee: Exciting Technology, LLC, Dayton, OH (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/091,165

(22) Filed: Nov. 6, 2020

(65) Prior Publication Data

US 2021/0109220 A1 Apr. 15, 2021

Related U.S. Application Data

(63) Continuation of application No. 15/577,435, filed as application No. PCT/US2016/035146 on Jun. 1, 2016, now Pat. No. 10,859,701.

(60) Provisional application No. 62/170,086, filed on Jun. 2, 2015.

(51) Int. Cl.
*G01S 17/58* (2006.01)
*G01S 17/89* (2020.01)
*G01S 7/48* (2006.01)
*G01N 21/64* (2006.01)
*G01N 21/71* (2006.01)
*G01V 8/20* (2006.01)

(52) U.S. Cl.
CPC .......... *G01S 17/58* (2013.01); *G01N 21/6402* (2013.01); *G01N 21/718* (2013.01); *G01S 7/4802* (2013.01); *G01S 17/89* (2013.01); *G01V 8/20* (2013.01)

(58) Field of Classification Search
CPC ........ G01S 17/58; G01S 17/89; G01S 7/4802; G01V 8/20; G01N 21/6402; G01N 21/718
USPC ....................................... 356/4.01
See application file for complete search history.

(56) References Cited

U.S. PATENT DOCUMENTS

| 5,070,483 | A | 12/1991 | Berni |
| 5,377,104 | A | 12/1994 | Sorrells et al. |
| 5,790,188 | A | 8/1998 | Sun |
| 10,859,701 | B2 * | 12/2020 | McManamon .......... G01V 8/20 |

(Continued)

FOREIGN PATENT DOCUMENTS

WO 2014143276 A9 9/2014

OTHER PUBLICATIONS

Kulhirummai, Sujit, et al.,"Flexible Depth of Field Photography," IEE Transactions on Pattern Analysis and Machine Intelligence, vol. 33, No. 1, January (14 pages).

*Primary Examiner* — Daniel L Murphy
(74) *Attorney, Agent, or Firm* — Maginot, Moore & Beck, LLP; Michael A. Swift (57) ABSTRACT

A system includes a ground-based area, an electromagnetic (EM) interrogation device having an EM emitter that directs an EM beam at the ground-based area. The EM interrogation device includes a detector array that receives reflected EM radiation from the EM beam, and a controller having a (Continued)

ground movement description module that determines a movement profile of the ground-based area in response to the reflected EM radiation.

34 Claims, 2 Drawing Sheets

(56) References Cited

U.S. PATENT DOCUMENTS

| | | | |
|---|---|---|---|
| 11,209,567 B2 * | 12/2021 | McManamon | G01V 3/30 |
| 2004/0252857 A1 | 12/2004 | Melese et al. | |
| 2011/0242934 A1 | 10/2011 | Thornton et al. | |
| 2015/0068984 A1 | 3/2015 | Milosevic et al. | |

* cited by examiner

SYSTEM, METHOD, AND APPARATUS FOR DETECTING AND CHARACTERIZING GROUND MOTION

This application is a continuation of U.S. application Ser. No. 15/577,435, which was filed on Nov. 28, 2017 and claims the benefit of priority to PCT Application, Serial No. PCT/US16/35146, filed on Jun. 1, 2016, which further claims priority to U.S. provisional application Ser. No. 62/170,086 filed on Jun. 2, 2015, the disclosures of which are herein incorporated by reference in their entirety.

DESCRIPTION OF ILLUSTRATIVE EMBODIMENTS

For the purposes of promoting an understanding of the principles of the invention, reference will now be made to specific embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention, as illustrated therein, as would normally occur to one skilled in the art to which the invention relates, are contemplated herein.

Figure 1:
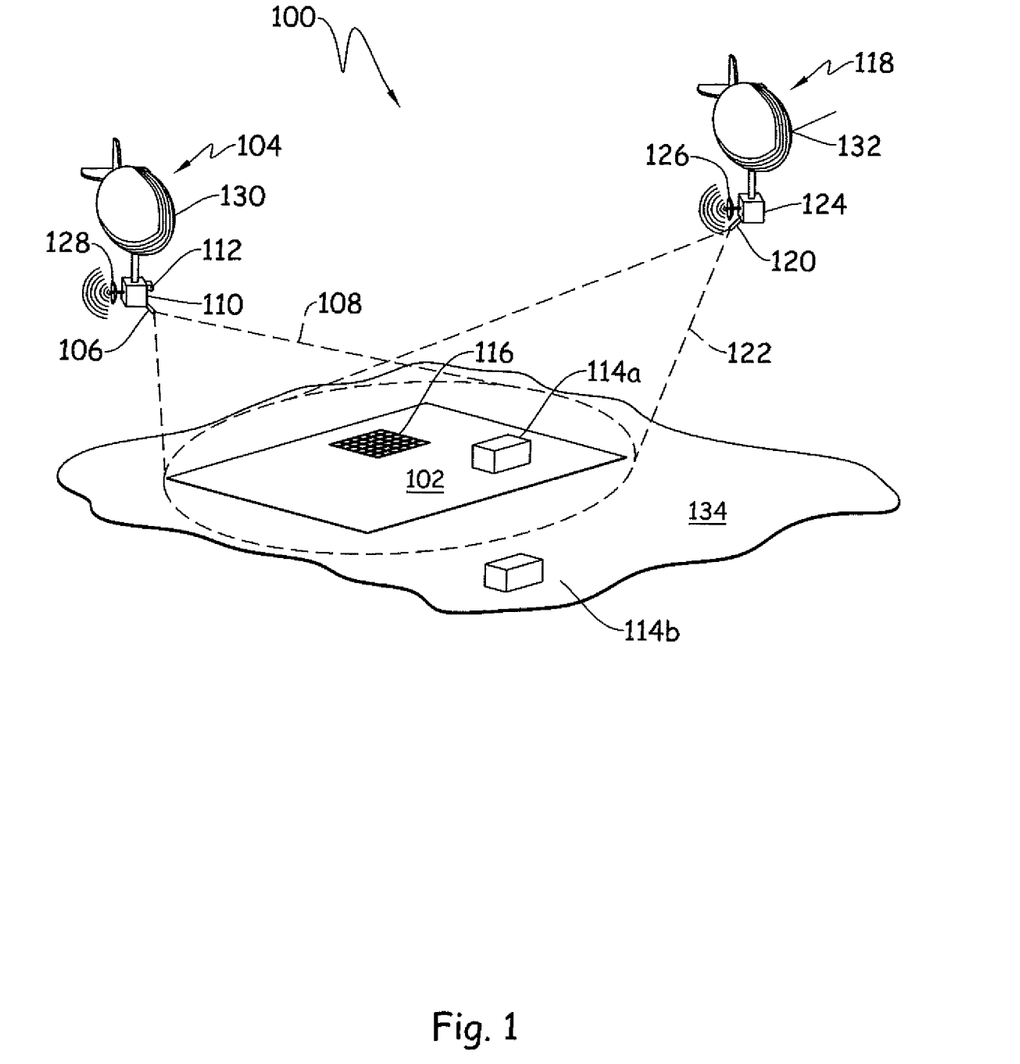
FIG. 1 is a non-limiting perspective view of a system of the present disclosure.

An example system 100 for determining a movement profile of a ground-based area is depicted schematically in FIG. 1. The system 100 includes a ground-based area 102. The ground-based area 102 is described as "ground-based" for purposes of convenient description. However, "ground" as used herein is to be understood broadly, and is understood to include any reference surface, whether terrestrial, natural, manufactured, or the like. Non-limiting ground-based areas 134 include, without limitation, a ground area (e.g. earth, rock, etc.), a building, a bridge, a parking lot, a water surface (a lake, pond, pool, bay, section of ocean, etc.), and/or combinations of these. An example ground-based area 102 is an area within a larger area 134, which may be the same or a distinct material from the ground-based area 102, for example the ground-based area 102 may be a location of interest within the larger area 134.

The system 100 further includes an electromagnetic (EM) interrogation device 104 having an EM emitter 106 that directs an EM beam 108 at the ground-based area 102. The EM beam 108, in certain embodiments, is an EM beam having a phase and frequency structured to interrogate the ground-based area 102 and provide motion information about the ground-based area 102. Example and non-limiting EM beams 108 include coherent light (LIDAR) and/or laser LADAR beams. Example EM beams 108 include a selected waveform, such as a laser waveform, and further including without limitation a pulse doublet, a frequency modulated waveform, a chirped waveform, and/or a random or pseudo-random coded waveform. A frequency "chirped" waveform can be chirped in one or both directions—for example with a saw tooth wave waveform with increasing or decreasing frequency. Example and non-limiting waveform selection examples include waveform selections to enhance range resolution or range precision, waveform selections to perform unambiguous range determination, waveform selections to positively identify which returning EM radiation reflection corresponds to which emitted EM radiation pulse, and/or waveform selections to enhance velocity determination precision or resolution.

The system 100 further includes a detector array 110 that receives reflected EM radiation from the EM beam 108. An example detector array 110 is a grid of optical detection pixels, and may receive reflected EM radiation through the same aperture or a distinct aperture from the one used in emitting the EM beam 108. The detector array 110 is depicted in the same line of sight as the EM beam 108 with the ground-based area 102 for convenience of description, however a beam splitter or other optical device may be utilized wherein the detector array may be alternatively arranged. Any arrangement of the detector array 110 and EM emitter 106 is contemplated herein.

The system 100 is described for convenience having a detector array 110 that conceptually scans the ground-based area 102 with an array consisting one or more detectors. Each detector can, for example, generate a two-dimension pixel, or a 3-dimensional voxel, as well as measuring velocity. It is contemplated herein that a system 100 may include multiple range returns within a pixel, for example providing multiple 3-dimensional voxels within in a single angle/angle pixel location. One of skill in the art having the benefit of the disclosure herein can readily configure a system 100 to use pixels, voxels, or other imaging description techniques, and these are not limiting to the system 100.

An example system 100 includes the EM beam 108 illuminating a large area of the ground-based area 102, and the detector array 110 receiving reflected EM radiation from the entire illuminated area and/or scanned and/or stepped stair portions of the illuminated area—for example covering 32×32 detectors, or 128×128 pixels, or the like. An example implementation includes stepping a focal plane array-based camera ten (10) times in one direction, or in a 3×4 pattern of the illuminated area. Another example includes utilizing a linear array of detectors 110 covering all or a portion of the illuminated region, and then scanning the linear array. Another example includes utilizing a 2-D pixel array of detectors 110, such as 128 in the cross-scan direction by 10 in the scan direction, and scanning in the scan (10) direction, adding movement information each time the detectors 110 collect EM reflection information. An example including ten detectors 110 would include sampling the scan direction ten (10) times.

The system 100 further includes a controller 112. The system includes a controller having a number of modules structured to functionally execute operations to detect and characterize ground motion of the ground-based area 102. Any controller described herein forms a portion of a processing subsystem including one or more computing devices having memory, processing, and communication hardware. Each controller may be a single device or a distributed device, and the functions of each controller may be performed by hardware and/or as computer instructions on a non-transient computer readable storage medium.

In certain embodiments, a controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer-based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

Figure 2:
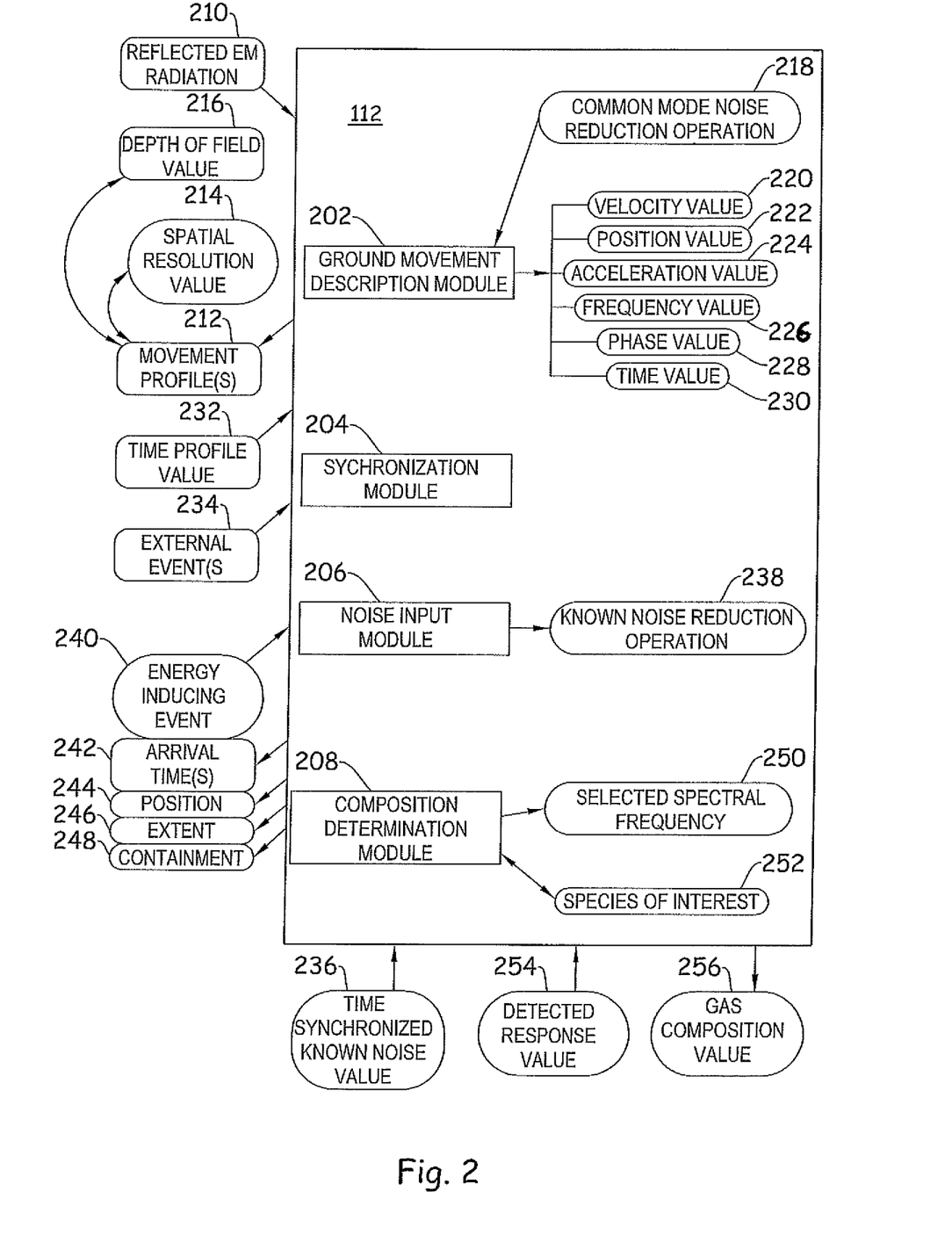
FIG. 2 is a non-limiting view of a flow chart of the present disclosure.

Referring to FIG. 1 and FIG. 2, hardware and/or process implementations included in any one or more of the modules described herein, including the ground movement description module 202, the synchronization module 204, the noise input module, 206, and the composition determination module 208 may include, without limitation, a LIDAR device, a LADAR device, a Laser radar device, an EM emitter, an EM receiver, one or more receiving apertures, a synthetic aperture EM emitter and receiver (synthetic aperture radar—SAR, or a synthetic aperture lidar—SAL), an inverse SAR or inverse SAL, and/or one or more receiving detector or pixel grids. Additionally, or alternatively, hardware and/or process implementations in one or more modules may include a 1-D, 2-D, and/or 3-D EM detection and receiving device. Additionally or alternatively, hardware and/or process implementations included in one or more modules may include a coherent EM detection and receiving device, a polarized EM detection and receiving device, an EM detection and receiving device with a polarization splitter, a differential absorption EM detection and receiving device, a Laser Induced Breakdown Spectroscopy (LIBS) device, a Laser Induced Fluorescence (LIF) device, and/or an EM detection an receiving device using polarization as a discriminate to distinguish between materials and/or surfaces. Additionally or alternatively, hardware and/or process implementations included in one or more modules may include an active multispectral EM emitter and receiver device, a non-mechanical steerable EM emitter (e.g. a phased array, or phased array of phased arrays LIDAR), a multiple-input multiple-output, MIMO, EM emitter and receiver device, an EM detection and receiving device using a local oscillator (LO) to detect the received phase and amplitude of an EM field, a heterodyne EM detection and receiving device (a temporal heterodyne and/or a spatial heterodyne device), a Gaussian EM emitter, and/or a super-Gaussian EM emitter, or an EM emitter with a shaped, or a different, emission pattern.

Additionally or alternatively, hardware and/or process implementations in one or more modules may include a GPS, an oriented GPS and/or compass, an aiming gimbal, a fast-steering mirror, a Risley prism and/or grating, a polygon scanning mirror, a liquid crystal steering device, an electro-wetting steering device, a steerable electro-evanescent optical refraction device, a polarization birefringent grating beam steering device, a liquid crystal polarization grating steering device (single or multiple stages), a lenslet-based beam steering device, an electronically written lenslet steering device, and/or a mixed lenslet array steering device. Additionally, or alternatively, modules may be constructed to be in communication with and/or to receive non-transient information from any of these.

Additionally or alternatively, modules may include processing operations to extract field amplitude and phase information from multiple interferograms, to make skew and/or trapezoid corrections, to make corner cube corrections (dihedral or trihedral), to make speckle corrections, to make atmospheric absorption corrections, atmospheric scattering corrections, atmospheric turbulence corrections, aero-optical effects corrections, signal-to-noise corrections (e.g. thermal noise, shot noise, background noise, and dark current noise), adjustments to improve heterodyne mixing efficiency, pulse coding (for noise correction, unambiguous range determination, etc.), and/or range measurement processing of the EM pulse information. Additionally, or alternatively, modules may include processing operations to make corrections include analytical operations to correct for observed effects, and/or hardware selection choices to mitigate predicted and/or observed effects for a given system 100 and ground-based area 102.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Referencing FIG. 2, the controller 112 includes a ground movement description module 202 that determines a movement profile 212 of the ground-based area 102 in response to the reflected EM radiation 108. Example and non-limiting implementations of the ground movement description module 202 include hardware, processing, and/or operations to query the ground-based area 102 with EM radiation, to determine the movement of the ground-based area 102 during a time of interest, and to construct the movement profile 212 in response to the movement of the ground-based area 102 during the time of interest. In certain embodiments, the movement profile 212 is constructed from spatial displacement of the ground-based area 102, from the velocity of the ground-based area 102, from the acceleration of the ground-based area 102, from frequency information included in the movement of the ground-based area 102, from vibration information included in the movement of the ground-based area 102, and/or from one or more of these included in portions of the ground-based area 102 from one or more locations of the ground-based area 102 and/or at the same location within the ground-based area 102.

An example movement profile 212 includes a velocity value 220 of the ground-based area 102. For example, the ground movement description module 202 calculates whether any portion of the ground-based area 102 is in motion during the time of observation, and reports the velocity value 220 of the motion as the movement profile 212. The example velocity value 220 is reported for any portion of the ground-based area 102 at a selected spatial resolution (e.g. the "X-Y" plane relative to the detector array 110) according to the capability of the EM beam 108 and detector array 110, potentially the processing capability available to the processing subsystem of the system 100, as well as the underlying principles of the observed aspect of the ground-based area 102. The example velocity value 220 is reported for any portion of the ground-based area 102 at a selected depth of field 216 resolution (e.g. the "Z" plane relative to the detector array 110) according to, without limitation, the capability of the EM emitter 106 and EM beam 108, the selected phase and frequency of the EM beam 108, and/or the use of certain techniques such as the use of a local oscillator (LO) to enhance the depth of field 216 resolution capability.

The velocity value 220 of the motion reported as the movement profile 212 may be any velocity value understood in the art that is relevant to the system of interest, and will be dependent upon the underlying principles of operation of the system and the reason for observing the ground-based area 102. Example considerations include, without limitation, a velocity value 220 of the ground-based area 102 consistent with degradation of a component of the system, a velocity value 220 consistent with a successful treatment operation, a velocity value 220 consistent with a mechanical failure of a component of the system, a velocity value 220 consistent with a loss of fluid or hydraulic containment, a velocity value 220 consistent with an intentionally induced mechanical stress, and/or velocity values 220 consistent with imminent incidents of the foregoing. Example and non-limiting velocity values 220 includes a maximum observed value of the velocity, an averaged value of the velocity over any portion of the observation period and/or throughout the observation period, a root-mean-squared value of the velocity for any statistically relevant portion of the observed velocity values, a sequence of corresponding time and velocity paired values (e.g. a velocity plot or equivalent stored data), and/or any other description of the velocity value 220. One of skill in the art, having an understanding of the system ordinarily available, and the benefit of the disclosure herein, will readily understand velocity values 220 to include in a movement profile 212.

An example controller 112 includes the ground movement description module 202 that determines the movement profile 212 in response to a position value 222 of the ground-based area 102. For example, the ground movement description module 202 calculates whether any portion of the ground-based area 102 has moved or been displaced during the time of observation, and reports the position value 222 of the ground-based area 102 as the movement profile 212. The example position value 222 is reported for any portion of the ground-based area 102 at a selected resolution according to the capability of the EM beam 108 and detector array 110, potentially the processing capability available to the processing subsystem of the system 100, as well as the underlying principles of the observed aspect of the ground-based area 102.

Example considerations include, without limitation, a position value 222 of the ground-based area 102 consistent with degradation of a component of the system, a position value 222 consistent with a successful treatment operation, a position value 222 consistent with a mechanical failure of a component of the system, a position value 222 consistent with a loss of fluid or hydraulic containment, a position value 222 consistent with an intentionally induced mechanical stress, a position value 222 consistent with a depletion of an amount of fluid in a fluid reservoir, a position value 222 utilized to provide a surface description in response to the movement profile, and/or to provide a subsystem volume in response to the surface description, and/or position values 222 consistent with imminent incidents of the foregoing.

Example and non-limiting position values 222 include a maximum observed value of the position, an averaged value of the position over any portion of the observation period and/or throughout the observation period, a root-mean-squared value of the position for any statistically relevant portion of the observed position values, a sequence of corresponding time and position paired values (e.g. a position plot or equivalent stored data), and/or any other description of the position value 222. One of skill in the art, having an understanding of the system ordinarily available, and the benefit of the disclosure herein, will readily understand position values 222 to include in a movement profile 212.

An example controller 112 includes the ground movement description module 202 that determines the movement profile 212 in response to an acceleration value 224 of the ground-based area 102. For example, the ground movement description module 202 calculates whether any portion of the ground-based area 102 experiences an acceleration event during the time of observation, and reports the acceleration value 224 of the ground-based area 202 as the movement profile 212. The example acceleration value 224 is reported for any portion of the ground-based area 102 at a selected spatial resolution (e.g. the "X-Y" plane relative to the detector array 110) according to the capability of the EM beam 108 and detector array 110, potentially the processing capability available to the processing subsystem of the system 100, as well as the underlying principles of the observed aspect of the ground-based area 102. The example acceleration value 224 is reported for any portion of the ground-based area 102 at a selected depth of field 216 resolution (e.g. the "Z" plane relative to the detector array 110) according to, without limitation, the capability of the EM emitter 106 and EM beam 108, the selected phase and frequency of the EM beam 108, the use of certain techniques such as the use of a local oscillator (LO) to enhance the phase and/or velocity information, and/or the execution rates of the acceleration determination operations and the processing power committed to the acceleration determination operations.

The acceleration value 224 of the motion reported as the movement profile 212 may be any acceleration value understood in the art that is relevant to the system of interest, and will be dependent upon the underlying principles of operation of the system and the reason for observing the ground-based area 102. Example considerations include, without limitation, an acceleration value 224 of the ground-based area 202 consistent with degradation of a component of the system, an acceleration value 224 consistent with a successful treatment operation, an acceleration value 224 consistent with a mechanical failure of a component of the system, an acceleration value 224 consistent with a loss of fluid or hydraulic containment, an acceleration value 224 consistent with an intentionally induced mechanical stress, and/or velocity values 220 consistent with imminent incidents of the foregoing.

Example and non-limiting acceleration values 224 include a maximum observed value of the acceleration, an averaged value of the acceleration over any portion of the observation period and/or throughout the observation period, a root-mean-squared value of the velocity for any statistically relevant portion of the observed acceleration values, a sequence of corresponding time and acceleration paired values (e.g. an acceleration plot or equivalent stored data), and/or any other description of the acceleration value 224. One of skill in the art, having an understanding of the system ordinarily available, and the benefit of the disclosure herein, will readily understand acceleration values 224 to include in a movement profile 212.

An example controller 112 includes the ground movement description module 202 that determines the movement profile 212 in response to a frequency value 226 of the ground-based area 102. For example, the ground movement description module 202 calculates frequency values 226 in the movement of the ground-based area 102, and provides the movement profile 212 in response to the frequency values 226. Non-limiting examples include determining frequency-based information from any device or subsystem in stress communication with the ground-based area 102. For example, and without limitation, identification of equipment, detection of degradation of equipment and/or devices, passing of communication signals, determination of event occurrences and types, are all potential uses of the movement profile 212 from the frequency value 226 by one of skill in the art having the benefit of the disclosures herein. The movement profile 212 may be constructed from the frequency value 226 utilizing frequency deconvolution techniques such as, without limitation, Fourier transforms, fast Fourier transforms (FFTs), high speed sampling, and/or the frequency values 226 may be utilized directly without deconvolution of the movement values of the ground-based area 102.

An example operation to utilize the frequency values 226 to provide the movement profile 212 includes determining an amplitude of a movement of a portion of the system 100 in response to 1) understanding an expected contribution of the portion of the system (e.g. due to a resonant frequency or operating frequency of the portion of the system), 2) detecting the actual contribution of the portion of the system (e.g. detecting the actual contribution at the resonant frequency or operating frequency by observing the area where the portion of the system would cause movement, and performing an FFT to see if movement is occurring at the expected frequency), and 3) comparing the expected contribution to the actual contribution to determine if (a few examples): the equipment is operating properly, or if the bridge is deflecting more than expected, or if the equipment has not yet been activated, or if one of the cylinders is not operating properly, etc.

Example and non-limiting operations to utilize the frequency values 226 to provide the movement profile 212 include: determining messages from a frequency modulated signal, determining that a movement is not a background or noise movement in response to a frequency value 226, backing out a noise component from the movement in response to a frequency value 226, backing out a known noise component from the movement in response to a known frequency value 226, and/or backing out a common mode noise component that occurs in both a first EM detection device 104 and a second EM detection device 118 at a particular frequency value 226.

An example controller 112 includes the ground movement description module 202 that determines the movement profile 212 in response to a phase value 228 of the ground-based area 102. For example, the ground movement description module 202 calculates phase values 228 in the movement of the ground-based area 102, and provides the movement profile 212 in response to the phase values 228. Non-limiting examples include determining phase-based information from any device or subsystem in stress communication with the ground-based area 102. For example, and without limitation, identification of equipment, detection of degradation of equipment and/or devices, passing of communication signals, determination of event occurrences and types, are all potential uses of the movement profile 212 from the phase value 228 by one of skill in the art having the benefit of the disclosures herein.

An example operation to utilize the phase value(s) 228 to provide the movement profile 212 includes determining an amplitude of a movement of a portion of the system 100 in response to 1) understanding an expected contribution of the portion of the system (e.g. due to a phase contribution of the portion of the system, e.g. by the number of cylinders and/or phases of a pump contributing thereto), 2) detecting the actual contribution of the portion of the system (e.g. detecting the individual pulses of the portion of the system and the phases thereof), and 3) comparing the expected contribution to the actual contribution to determine if (a few examples): the equipment is operating properly, or if the equipment has not yet been activated, or if one of the cylinders is not operating properly, etc.

An example controller 112 includes the ground movement description module 202 that determines the movement profile 212 in response to a time value 230 of the ground-based area 102. For example, the ground movement description module 202 calculates phase values 228 in the movement of the ground-based area 102, and provides the movement profile 212 in response to the phase values 228. For example, and without limitation, the ground movement description module 202 determines an expected progress of the movement profile 212 over time, and/or monitors that no movement has occurred as expected over time, and determines whether a treatment or operation is successful or has failed in response to the movement profile 212.

An example controller 112 further includes a synchronization module 204 that interprets a time profile value 232 corresponding to an external event 234, and synchronizes the determining of the movement profile 212 to the external event 234. The synchronizing the movement profile 212 to the external event 234 can include, without limitation, correcting the detection array 110 such that the movement profile 212 is created independent of the external event 234, and/or creation of the movement profile 212 recognizing the effect of the external event 234 on the movement profile 212. Example and non-limiting external events 234 include external events that induce a mechanical stress that are in mechanical stress coupling to the ground-based area 102, such as but not limited to construction events, pumping events, seismic events, underground events (not shown), and/or other events known in the art. External inducing equipment may be within the ground-based area such as on-location inducing equipment 114a, or outside the ground-based area such as remote inducing equipment 114b, and may communicate directly with the controller 112, or may communicate indirectly—for example by operating in an agreed upon schedule or manner. In certain embodiments, the ground movement description module 202 further relates at least a portion of the movement profile 212 to the external event 234 in the time domain.

In certain embodiments, the system 100 includes an energy inducing device operationally coupled to the ground-based area 102, such as the on-location inducing equipment 114a and/or the remote inducing equipment 114b, and the ground movement description module further determines the movement profile 212 in response to an energy inducing event 240 from the energy inducing device 114a, 114b. Example and non-limiting determinations of the movement profile 212 from the energy inducing events 240 include determining: at least one arrival time 242 from the entering inducing device, a position 244 of the energy inducing event 240, an extent 246 of the energy inducing event, and/or a containment 248 (or lack thereof) of the energy inducing event. An example energy inducing devices includes an explosive device, such as an explosive utilized in demolition, construction, road building, a seismic source, a thumper truck, and/or a perforating tool. Another example energy inducing device includes a hydraulic hammer (e.g. a seismic source) or other hydraulic and/or pneumatic device, a sonic device, an ultrasonic device, an electrically operated device, a pneumatically operated device, a hydraulic inducement, and/or a hydraulically operated device. The energy inducements listed may be the initial energy source listed, and/or may be the inducement energy source, with a prime mover such as an internal combustion engine or the like driving the inducement energy source. The term "energy inducing device" 114a, 114b should be understood broadly to be any device capable of mechanically engaging the ground-based area 102 in a manner sufficiently to be detectable as movement by the EM interrogation device(s) 104, 118, either through deliberate operations of the energy inducing devices 114a, 114b, and/or as a byproduct of other operations of the energy inducing devices 114a, 114b.

An example system 100 further includes the ground movement description module 202 determining the movement profile 212 in response to an energy inducing event 240 by determining an extent 246 of the inducing, where the extent 246 of the inducing is a spatial extent. An example extent 246 of the inducing includes an X-Y description of an area affected by the energy inducing event 240. Another example extent 246 of the inducing includes an indicator that the energy inducing event has exceeded a threshold extent value. In certain embodiments, the threshold extent value can be an azimuthal threshold value, for example an X directional value, a Y directional value, or some radial angle value in the X-Y plane, and/or the extent can be a Z-directional value, such as an indication that a given area of the ground-based area 102 has raised beyond a threshold value, and/or that some movement has occurred consistent with movement somewhere else in the system 100. The provided examples determining the extent 246 values are non-limiting examples, and combinations of these, and/or other extent values understood to one of skill in the art having the benefit of the disclosures herein, are contemplated herein.

An example system 100 includes the ground movement description module 202 determining the movement profile 212 in response to an arrival time(s) 242 following the energy inducing event 240. For example, an energy inducing device 114b may be in communication with the EM interrogation device 104, and/or the devices 104, 114b may otherwise be synchronized, such that the ground movement description module 202 is able to determine an observed time lag between the energy inducing event 240 and the arrival of movement consistent with resulting pressure waves (P-waves) and shear waves (S-waves). Additionally, or alternatively, a signal may be introduced to the energy inducing event 240 such that the start time between at least two energy inducing events may be induced from the event itself—for example through a sequenced set of energy events, or the like.

An example system 100 includes the ground movement description module 202 determining the movement profile 212 in response to a position 244 of the energy inducing event 240. For example, an exact location of a perforating event in a horizontal wellbore may be unknown, and a position within the ground-based area 102 experiencing the greatest acceleration, velocity, and/or positional movement at a time of firing of the perforating gun may be estimated to be the position of the perforating gun at the time of firing. The information provided by the ground movement description module 202 may be combined with other information available, such as how far the tool has run in the wellbore (not shown), how deep the well is, the angle and wellbore trajectory, etc., to provide an estimate of the position of the perforating gun at the time of firing. Additionally or alternatively, the position 244 of the energy inducing event 240 may be a position of an injection into a formation, of a wellbore screen-out event, of a failing pump, of a failing piece of equipment, of a degrading piece of equipment, confirmation of correct placement of an energy inducing device 114a, 114b, and/or identification of equipment layout at a location (e.g. by confirming placement of several energy inducing devices 114a).

An example system 100 includes the ground movement description module 202 determining the movement profile 212 in response to a containment value 248 of the energy inducing event 240. An example includes determining that the energy inducing event 240 has not broken out of a designated zone—for example that movement of the ground-based area 102 is consistent with zone containment in a hydraulic fracture treatment for a shallow horizontal shale or coal bed methane well. In certain embodiments, the controller 112 is in communication with the energy inducing device 114a, and upon detecting movement of the ground-based area 102 consistent with a loss of containment or an imminent loss of containment, the controller 112 can communicate with the energy inducing device 114a and/or an operator thereto to take corrective actions to prevent or mitigate the loss of containment. Example and non-limiting actions include a reduction in the pumping rate, stopping pumping operations, and/or a reduction in the fluid viscosity being pumped into the formation.

In certain embodiments, the movement profile 212 includes a spatial resolution value 214 of not greater than 1 square foot pixels, a spatial resolution value of not greater than 1 square inch pixels, and/or a spatial resolution value of not greater than 1 square centimeter pixels. The range precision measured in each pixel may be a value no greater than 0.1 mm, or no greater than 1 mm, or no greater than 1 cm, or no greater than 1 inch, or no greater than 1 foot. Range resolution values may be no greater than 0.1 mm, or no greater than 1 mm, or no greater than 1 cm, or no greater than 1 inch, or no greater than 1 foot. Referencing FIG. 1, a grid 116 is illustrated on the ground-based area 102 depicting a portion of the ground-based area 102 showing an illustrative resolution of the area. The selection of a spatial resolution value 214 depends upon the purpose for determining the movement profile 212, and modern EM interrogation devices 104, 118 known to those of skill in the art are fully capable of resolutions of 1 cm or even smaller if the purpose of the system 100 makes such resolution desirable. Determination of hydraulic fracture lengths on the order of hundreds of feet may not require a resolution of 1 square cm, but could be 1 square foot or even greater. Determination of a bridge failure location with the best possible resolution, or attempting to identify movement in separate treating lines from one another—which may be several inches across—may lead one of skill in the art to select a spatial resolution of 1 square cm. One of skill in the art, having the benefit of the disclosures herein, can select a detector array 110 and appropriate processing equipment 112 to develop the desired spatial resolution value 214 for a particular system 100.

An example system 100 includes a number of EM interrogation devices 104, 118. Each device 104, 118 includes an EM emitter 106, 120, and each emitter 106, 120 directs at least one EM beam 108, 122 to the ground-based area 102. Each EM interrogation device 104, 118 further includes a detector array 110, 124 which receives reflected radiation 210 from the ground-based area 102, which may be received through the same or a distinct aperture from the aperture utilized by the emitter 106, 120. The detector array 110, 124 may receive reflected radiation from a beam splitter, or may be somewhat remotely located from the emitter 106, 120, as will be understood to those skilled in the art. Each EM interrogation device 104, 118 in the example further includes a transceiver 126, 128 for providing wireless communications to and from a controller 112, 124, although the controllers 112, 124 may be in communication with other portions of the system 100 by any other communication devices understood in the art.

The controllers 112, 124, as described above, form a portion of a processing subsystem, and may be distributed devices and/or combined. The controllers 112, 124 may be on the EM interrogation devices 104, 118 as depicted in FIG. 1, in whole or part, or may be remote from the EM interrogation devices. The controllers 112, 124 are in operative communication with any sensor and/or actuator in the system 100 as needed to perform any operations of the controllers described herein.

The EM interrogation devices 104, 118 are schematically depicted in FIG. 1 as being deployed on dirigibles, which may be positioned by GPS. However, the EM interrogation devices 104, 118 may be positioned at the location 134 above the ground-based area 102 in any fashion, including at least on a tower, on a boom, on a drone, on an unmanned air vehicle, UAV, on a helicopter, on a tethered or untethered balloon, on a rig, and/or on any structure that is already present at the location 134. While being present on a stationary or a controlled-movement object is helpful, the EM interrogation devices 104, 118 can be positioned on a moving object, as the controller 112, 124 can correct for movement—including flight such as from a plane, a UAV, or a drone. Additionally, while being closer to straight above the ground-based area 102 is helpful, the controller 112, 124 can correct for skew, including a significant amount of skew exceeding 45 degrees from the horizontal. Additionally, in certain embodiments the EM interrogation devices 104, 118 may be in position only intermittently during the observation period and still build a movement profile 212 of the ground-based area 102.

In certain embodiments, the EM interrogation devices 104, 118 corresponding to a number of EM emitters 106, 120, each directing a corresponding EM beam 108, 122 at the ground-based area, and each having a corresponding detector array 110, 124 that receives reflected EM radiation 210 from the corresponding EM beams. The controllers 112, 124 each have a ground movement description module 202 that determines a movement profile 212 of the ground-based area 102 in response to the reflected EM radiation from each of the corresponding EM beams 108, 122. The system 100 further includes the ground movement description module 202 determine the movement profile 212 in response to a common mode noise reduction operation 218. For example, the ground movement description module 202 rejects and/or reduces noise appearing on both detector arrays 110, 124—which may include checking for time phase lag, etc. if such is sensible for the physical system (e.g. the EM emitters 106, 120 are differentially spaced, and 0.25 seconds of lag appears in a common mode noise).

The example system 100 further includes the controllers 112, 124 having a noise input module 206 that interprets a time synchronized known noise value 236 where the ground movement description module 202 further determines the movement profile 212 in response to a known noise reduction operation 238 performed in response to the time synchronized known noise value 236. For example, the energy inducing devices 114a may have a superficial surface disturbance on a planned schedule that is known to disturb the surface in a known way, and the noise input module 206 will input the planned schedule as the known noise reduction operation 238 to either ignore those time periods and/or correct for them in a known manner. Non-limiting examples include demolition operations, pumping operations, drilling operations, etc.

An example system 100 further includes a gas composition detector (not shown—but it can share the same equipment with the EM emitter 106) that interrogates an air volume in proximity to the ground-based area 102 with an EM radiation including at least a selected spectral frequency value 250, a second detector array (not shown) structured to receive the reflected EM radiation 210 having the selected spectral frequency value 250 and to provide a detected response value 254, and where the controller 112 further includes a composition determination module 208 that determines a gas composition value 256 in response to the detected response value 254.

A fraction of a laser or coherent light will reflect off the atmosphere back to a detector, and in one example if the light includes a reference frequency or wavelength which does not substantially absorb, along with light having frequencies within an absorption spectrum for a species of interest 252, then an absorption differential can determine the gas composition value 256. In certain embodiments, the gas composition value 256 includes an indication of the species of interest 252 in the air volume in proximity to the ground-based area 102. In certain further embodiments, the species of interest includes $CO_2$, $H_2S$, a natural gas component, and/or a tracer material. In certain embodiments, the natural gas component includes a hydrocarbon species having between 1 and 4 Carbons. In certain embodiments, the tracer material includes a material included in a wellbore treatment.

An example system includes the movement profile 212 having a depth of field value 216 with a resolution of not greater than 1 mm.

It will be understood by one of skill in the art, having the benefit of the disclosures herein, that the disclosures herein provide numerous improvements to various technologies and technological fields. Without limitation, technologies improved include the maintenance, service, and construction of civil engineering projects (buildings, bridges, roads, parking lots), through-solid material communication technologies, the tracking of substrate movement in response to both acute events and over time, and the improved ability to detect the presence of undesired or dangerous substances, or to confirm the presence of desired substances, which is particularly applicable to many civil and geological applications. Without limitation, improved technological fields include civil engineering, construction, geology, land use maintenance, road maintenance, and oil field applications.

The schematic operational descriptions which follow provides illustrative embodiments of performing procedures for determining a movement profile for a ground-based area. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

A method includes an operation to direct an electromagnetic (EM) beam at a ground-based area, to receive reflected EM radiation from the EM beam at a detector array, and to determine a movement profile of the ground-based area. An example method further includes an operation to determine the ground-based movement corresponding to at least a portion of the ground-based area, the description of the ground-based movement including a velocity value, a position value, an acceleration value, a frequency value, a phase value, and/or a time value. An example method further includes an operation to synchronize the determining to an external event, and an operation to relate at least a portion of the movement profile to the external event in the time domain.

An example method further includes an operation to induce a ground energy event, where the operation to determine the movement profile of the ground-based area is in response to the inducing. A further example method includes an operation to determine at least one arrival time event, an operation to determine a position of the inducing, an operation to determine an extent of the inducing, and/or an operation to determine a containment of the inducing.

An example method includes an operation to determine the movement profile with a spatial resolution not exceeding: greater than 1 square foot pixels, greater than 1 square inch pixels, and/or greater than 1 square centimeter pixels. An example method includes an operation to determine a number of movement profiles from a corresponding number of detector arrays positioned around the ground-based area. An example method includes an operation to determine the movement profile by performing a common mode noise operation, and/or by interpreting a time synchronized known noise value and performing a known noise reduction operation in response to the time synchronized known noise value.

An example method includes an operation to interrogate an air volume in proximity to the ground-based area with EM radiation including at least a selected spectral frequency value, an operation to receive reflected EM radiation from the EM radiation including the selected spectral frequency value, and an operation to determine the presence of a species of interest in the air volume in response to the reflected EM radiation. A further example method includes the species of interest being $CO_2$, $H_2S$, a natural gas component, and/or a tracer material.

An example method includes an operation to determine movement of a ground-based area, including illuminating the ground-based area with an electro-magnetic (EM) radiation device, and receiving reflected EM radiation from the ground-based area in response to the illuminating. The example method further includes processing the reflected EM radiation to determine movement information of at least a portion of the ground-based area in response to the receiving the reflected EM radiation. Example movement information includes at least one of displacement, velocity, acceleration, vibration, and movement frequency information of at least a portion of the ground-based area. The example method includes performing further operations including diagnosing a ground-based operation, diagnosing a ground-based device, receiving a communication from a device in vibrational communication with the ground-based area, and/or determining a status of a ground-based operation in response to the movement information. An example method further includes illuminating the ground-based area with an EM radiation device further including operating a differential absorption EM detection and receiving device, a Laser Induced Breakdown Spectroscopy (LIBS) device, and/or a Laser Induced Fluorescence (LIF) device and identifying a species of interest in the air volume in proximity to the ground-based area.

As is evident from the figures and text presented above, a variety of embodiments according to the present disclosure are contemplated. Any example system and/or module described herein may include any known hardware and/or process to implement the described features. One of skill in the art, having the benefit of the disclosures herein, will understand various embodiments to implement aspects of the disclosures herein. In certain embodiments, certain features may be implemented in accordance with certain hardware and/or processes described in the "Field Guide to Lidar," by Paul McManamon, published by SPIE Press as ISBN-13:978-16284 16541, and ISBN-10:16284 16548, available as of Mar. 30, 2015 on www.amazon.com, which is incorporated herein by reference in the entirety for all purposes.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    directing an electromagnetic (EM) beam at a ground-based area, wherein the EM beam comprises a coherent LIDAR;
    receiving with a spatial heterodyne EM detection and receiving device reflected EM radiation from the EM beam;
    utilizing a local oscillator (LO) to measure phase of the received reflected EM radiation to provide range and/or velocity measurements of the ground-based area; and
    determining a movement profile of the ground-based area.

2. The method of claim 1, wherein the determining comprises determining a description of ground-based movement corresponding to at least a portion of the ground-based area, the description of the ground-based movement comprising at least one member selected from the members consisting of: a velocity value, a position value, an acceleration value, a frequency value, a phase value, and a time value.

3. The method of claim 1, further comprising synchronizing the determining to an external event, and relating at least a portion of the movement profile to the external event in a time domain.

4. The method of claim 1, further comprising inducing a ground energy event, and wherein the determining the movement profile of the ground-based area is in response to the inducing.

5. The method of claim 4, wherein the determining the movement profile further comprises determining at least one arrival time event.

6. The method of claim 4, wherein the determining the movement profile further comprises determining a position of the inducing.

7. The method of claim 4, wherein the determining the movement profile further comprises determining an extent of the inducing.

8. The method of claim 4, further comprising determining a containment of the inducing in response to the determining the movement profile.

9. The method of claim 1, wherein the determining the movement profile comprises determining the movement profile of the ground-based area with a spatial resolution value selected from: not greater than 1 square foot pixels, not greater than 1 square inch pixels, and not greater than 1 square centimeter pixels.

10. The method of claim 1, further comprising determining a plurality of movement profiles from a plurality of detector arrays positioned around the ground-based area.

11. The method of claim 1, wherein the determining the movement profile further comprises performing a common mode noise reduction.

12. The method of claim 1, further comprising interpreting a time synchronized known noise value, and wherein the determining the movement profile further comprises performing a known noise reduction operation in response to the time synchronized known noise value.

13. The method of claim 1, wherein the movement profile further comprises a range precision value of not greater than 1 mm.

14. The method of claim 1, wherein the ground-based area comprises at least one of an earth-based structure and an artificial structure.

15. A system, comprising:
a ground-based area;
an electromagnetic (EM) interrogation device having a coherent LIDAR EM emitter structured to direct an EM beam at the ground-based area, and having a spatial heterodyne EM detection and receiving device structured to receive reflected EM radiation from the EM beam;
a local oscillator (LO); and
a controller having a ground movement description module structured to determine a movement profile of the ground-based area in response to a comparison of the reflected EM radiation to a signal of the LO.

16. The system of claim 15, wherein the ground movement description module is further structured to determine the movement profile in response to at least one member selected from a velocity value, a position value, an acceleration value, a frequency value, a phase value, and a time value.

17. The system of claim 15, wherein the controller further comprises a synchronization module structured to interpret a time profile value corresponding to an external event, and to synchronize the determining of the movement profile to the external event, and wherein the ground movement description module is further structured to relate at least a portion of the movement profile to the external event in the time domain.

18. The system of claim 15, further comprising an energy inducing device operationally coupled to the ground-based area and wherein the ground movement description module is further structured to determine the movement profile further in response to an energy inducing event from the energy inducing device.

19. The system of claim 18, wherein the ground movement description module is further structured to determine the movement profile further in response to an energy inducing event by determining at least one arrival time event of the energy inducing event.

20. The system of claim 18, wherein the ground movement description module is further structured to determine the movement profile further in response to an energy inducing event by determining a position of the energy inducing event.

21. The system of claim 18, wherein the ground movement description module is further structured to determine the movement profile further in response to an energy inducing event by determining an extent of the inducing.

22. The system of claim 18, wherein the ground movement description module is further structured to determine a containment of the inducing in response to the movement profile.

23. The system of claim 15, further comprising a plurality of EM interrogation devices corresponding to a plurality of EM emitters, each structured to direct a corresponding EM beam at the ground-based area, and each having a corresponding spatial heterodyne EM detection and receiving device structured to receive reflected EM radiation from the corresponding EM beams; and at least one controller having at least one ground movement description module structured to determine a plurality of movement profiles of the ground-based area in response to the reflected EM radiation from each of the corresponding EM beams.

24. The system of claim 15, wherein the ground movement description module is further structured to determine the movement profile in response to a common mode noise reduction operation.

25. The system of claim 15, wherein the controller further comprises a noise input module structured to interpret a time synchronized known noise value, and wherein the ground movement description module is further structured to determine the movement profile in response to a known noise reduction operation performed in response to the time synchronized known noise value.

26. The system of claim 15, further comprising a gas composition detector structured to interrogate an air volume in proximity to the ground-based area with an EM radiation including at least a selected spectral frequency value, a second detector array structured to receive the reflected EM radiation having the selected spectral frequency value and to provide a detected response value, and wherein the controller further comprises a composition determination module structured to determine a gas composition value in response to the detected response value.

27. The system of claim 26, wherein the gas composition value comprises the indication of a species of interest in the air volume in proximity to the ground-based area.

28. The system of claim 27, wherein the species of interest comprises at least one species selected from $CO_2$, $H_2S$, a natural gas component, and a tracer material.

29. The system of claim 15, wherein the movement profile further comprises a range precision value of not greater than 1 mm.

30. The system of claim 15, wherein the ground-based area comprises at least one of an earth-based structure and an artificial structure.

31. A method for determining movement of a ground-based area, comprising:

illuminating the ground-based area with a coherent LIDAR electro-magnetic (EM) radiation device;

receiving reflected EM radiation from the ground-based area in response to the illuminating;

utilizing a local oscillator (LO) to measure phase of the received reflected EM radiation to provide range and/or velocity measurements of the ground-based area; and processing the reflected EM radiation and a signal from the LO to determine movement information of at least a portion of the ground-based area in response to receiving the reflected EM radiation; and in response to the determining the movement information, performing at least one response operation, the response operation comprising at least one of the operations selected from:

diagnosing a ground-based operation in response to the movement information;

diagnosing a ground-based device in response to the movement information;

receiving a communication from a device in vibrational communication with the ground-based area in response to the movement area; and determining a status of a ground-based operation in response to the movement information.

32. The method of claim 31, wherein the illuminating the ground-based area with an electro-magnetic (EM) radiation device further comprises at least one operation selected from operating a differential absorption EM detection and receiving device, operating a Laser Induced Breakdown Spectroscopy (LIBS) device, and operating a Laser Induced Fluorescence (LIF) device.

33. The method of claim 31, wherein the determining the movement information further comprises determining at least one of displacement, velocity, acceleration, vibration, and movement frequency information of at least a portion of the ground-based area.

34. A method, comprising:

directing an electromagnetic (EM) beam at a ground-based area;

receiving reflected EM radiation from the EM beam at a detector array;

determining a movement profile of the ground-based area; and interrogating an air volume in proximity to the ground-based area with EM radiation including at least a selected spectral frequency value, receiving reflected EM radiation from the EM radiation including the selected spectral frequency value, and determining the presence of a species of interest in the air volume in response to the reflected EM radiation.

\* \* \* \* \*